(12) United States Patent
Park et al.

(10) Patent No.: US 11,343,362 B2
(45) Date of Patent: May 24, 2022

(54) ELECTRONIC DEVICE INCLUDING DISPLAY

(71) Applicant: Samsung Electronics Co., Ltd., Gyeonggi-do (KR)

(72) Inventors: Daehyeong Park, Gyeonggi-do (KR); Sangin Baek, Gyeonggi-do (KR); Jongmin Choi, Gyeonggi-do (KR); Byounguk Yoon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 179 days.

(21) Appl. No.: 16/851,712

(22) Filed: Apr. 17, 2020

(65) Prior Publication Data

US 2020/0336576 A1  Oct. 22, 2020

(30) Foreign Application Priority Data

Apr. 18, 2019  (KR) .................. 10-2019-0045293

(51) Int. Cl.
*H01Q 1/24* (2006.01)
*H04M 1/02* (2006.01)
*H01Q 21/06* (2006.01)

(52) U.S. Cl.
CPC .......... *H04M 1/0266* (2013.01); *H01Q 1/243* (2013.01); *H01Q 21/065* (2013.01); *H04M 2201/38* (2013.01)

(58) Field of Classification Search
CPC . H01Q 21/065; H01Q 1/243; H04M 2201/38; H04M 1/0266
See application file for complete search history.

(56) References Cited

U.S. PATENT DOCUMENTS

| | | |
|---|---|---|
| 2016/0021226 A1 | 1/2016 | Alloe et al. |
| 2017/0047645 A1 | 2/2017 | Lin et al. |
| 2017/0149940 A1 | 5/2017 | Moon et al. |
| 2018/0059722 A1 | 3/2018 | McClure et al. |
| 2018/0270976 A1 | 9/2018 | Pakula et al. |

FOREIGN PATENT DOCUMENTS

| | | |
|---|---|---|
| EP | 2 993 873 A1 | 8/2015 |
| KR | 10-2018-0006320 A | 1/2018 |
| KR | 10-1939715 B1 | 1/2019 |

OTHER PUBLICATIONS

International Search Report dated Aug. 7, 2020.
European Search Report dated Feb. 25, 2022.

*Primary Examiner* — Graham P Smith
(74) *Attorney, Agent, or Firm* — Cha & Reiter, LLC

(57) ABSTRACT

An electronic device is disclosed, including a first plate including a planar area oriented in a first direction, and a curved area extending from at least a portion of an edge of the planar area, a second plate oriented in a second direction opposite the first direction, the first plate and second plate defining an inner space, a support member disposed between the first plate and the second plate so as to surround the inner space, and a first adhesive member disposed between the curved area of the first plate and the support member, wherein the first adhesive member includes: a first adhesive layer attached to at least a portion of the curved area of the first plate, and is activated by heat, and a second adhesive layer attached to at least a portion of the support member.

20 Claims, 18 Drawing Sheets

ELECTRONIC DEVICE INCLUDING DISPLAY

CROSS-REFERENCE TO RELATED APPLICATION(S)

This application is based on and claims priority under 35 U.S.C. 119 to Korean Patent Application No. 10-2019-0045293, filed on Apr. 18, 2019, in the Korean Intellectual Property Office, the disclosure of which is herein incorporated by reference in its entirety.

BACKGROUND

1) Field

Various embodiments relate to an electronic device including a display.

2) Description of Related Art

Electronic devices may include antennas configured for 5G communication, which radiates using millimeter waves (mmWaves) facilitating an increase in speed for transmission and reception of high-quality content for users of the electronic devices. With the continuing development of communication devices, electronic devices may be equipped with these antennas for enabling fast and high-capacity transmission, enabling greater production and transmission of 3D content, faster connections between the Internet and various objects (e.g., the Internet of Things or "IoT"), and/or improved communication connection for a user's devices, such as the diverse sensors in a smart car that enable autonomous driving.

The above information is presented as background information only to assist with an understanding of the disclosure. No determination has been made, and no assertion is made, as to whether any of the above might be applicable as prior art with regard to the disclosure.

SUMMARY

An electronic device according to various embodiments may include a rear plate in the form of a curved surface defining a curvature in an area contacting with a side member to secure coverage of an antenna radiator that is formed as to be substantially straight.

Various embodiments may provide an electronic device capable of reducing slippage even if a joint portion between a front plate and a side support member is inclined.

In various embodiments of the invention, an electronic device is disclosed, including: a first plate including a planar area oriented in a first direction, and a curved area extending from at least a portion of an edge of the planar area, a second plate oriented in a second direction opposite the first direction, the first plate and second plate defining an inner space, a support member disposed between the first plate and the second plate so as to surround the inner space, and a first adhesive member disposed between the curved area of the first plate and the support member, wherein the first adhesive member includes: a first adhesive layer attached to at least a portion of the curved area of the first plate, and is activated by heat, and a second adhesive layer attached to at least a portion of the support member.

In various embodiments of the invention, an electronic device is disclosed, including: a first plate including a planar area, and two curved areas extending from at least some edges of the planar area, a second plate facing the first plate, the first and second plates defining an inner space between them, a support member disposed between the first plate and the second plate and surrounding the inner space, first and second antennas disposed adjacent to edges of the support member corresponding to the at least some edges on which the curved areas are formed, a first adhesive member disposed between the two curved areas of the first plate and the support member, and a second adhesive member formed along the edges of the first plate, wherein the first adhesive member comprises: a first adhesive layer including a first surface facing the curved area of the first plate, the first adhesive layer activated by heat; and a second adhesive layer including a second surface facing the support member.

According to various embodiments, an electronic device including a thermally activated adhesive member is able to reduce vertical errors caused by horizontal assembly tolerances of a rear plate when attaching the rear plate forming a housing to a curved support member or a side member.

According to various embodiments, an electronic device including a thermally activated adhesive member is able to reduce slippage even if a joint portion between the plate and the support member in the electronic device has a steep inclination.

According to various embodiments, an electronic device including a thermally activated adhesive member is able to provide a housing surrounding a curved portion of the electronic device.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
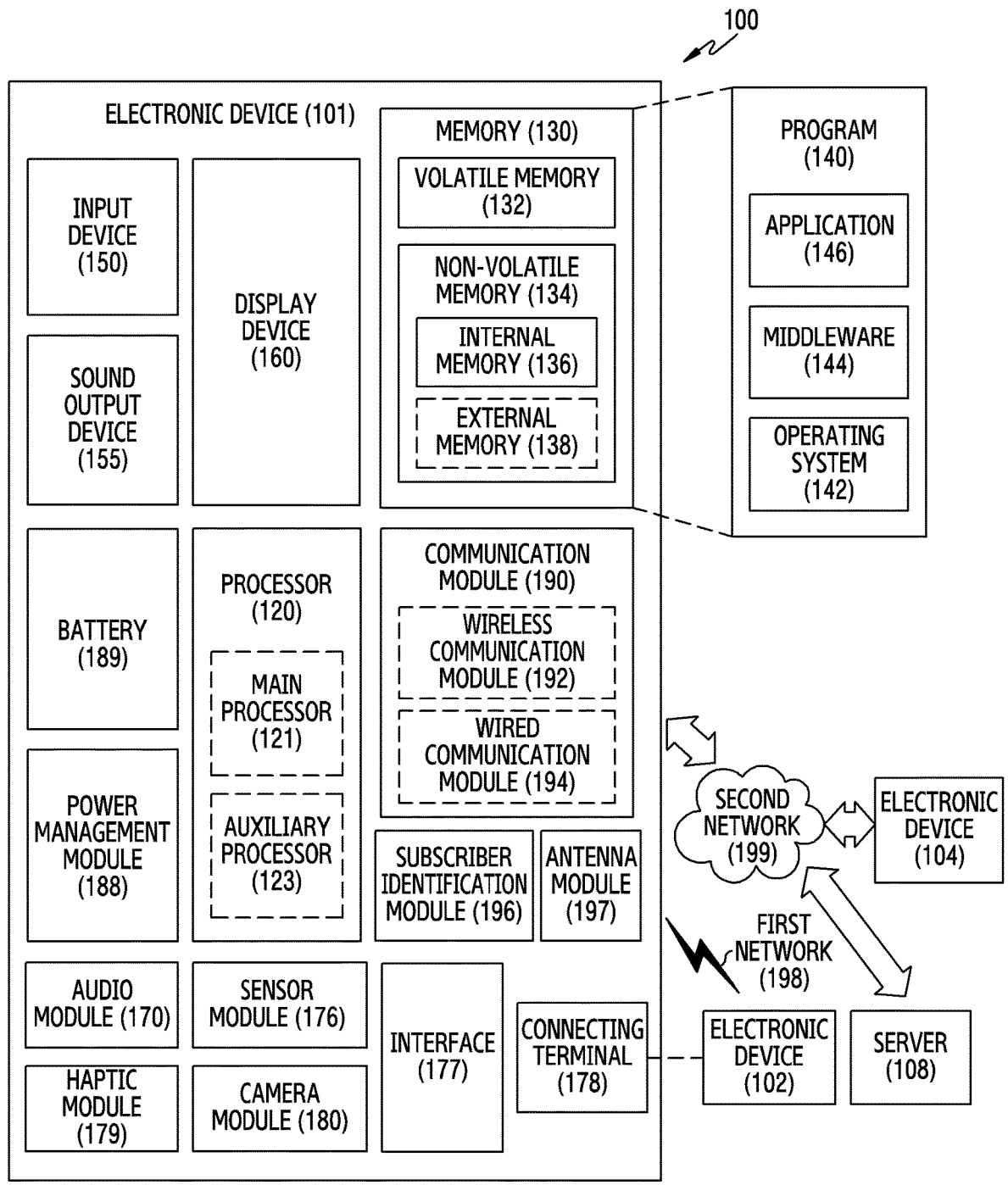
FIG. 1 is a block diagram illustrating an electronic device 101 in a network environment 100 according to various embodiments.

FIG. 1 is a block diagram illustrating an electronic device in a network environment according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
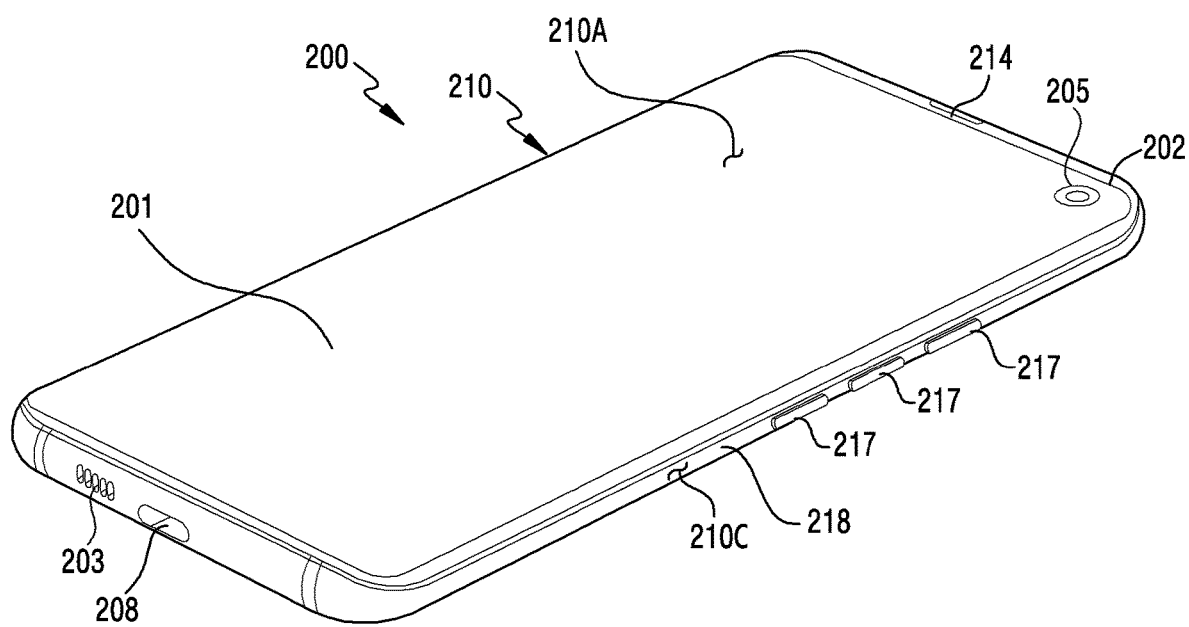
FIG. 2 is a perspective view showing an electronic device according one of various embodiments disclosed herein.
Figure 3:
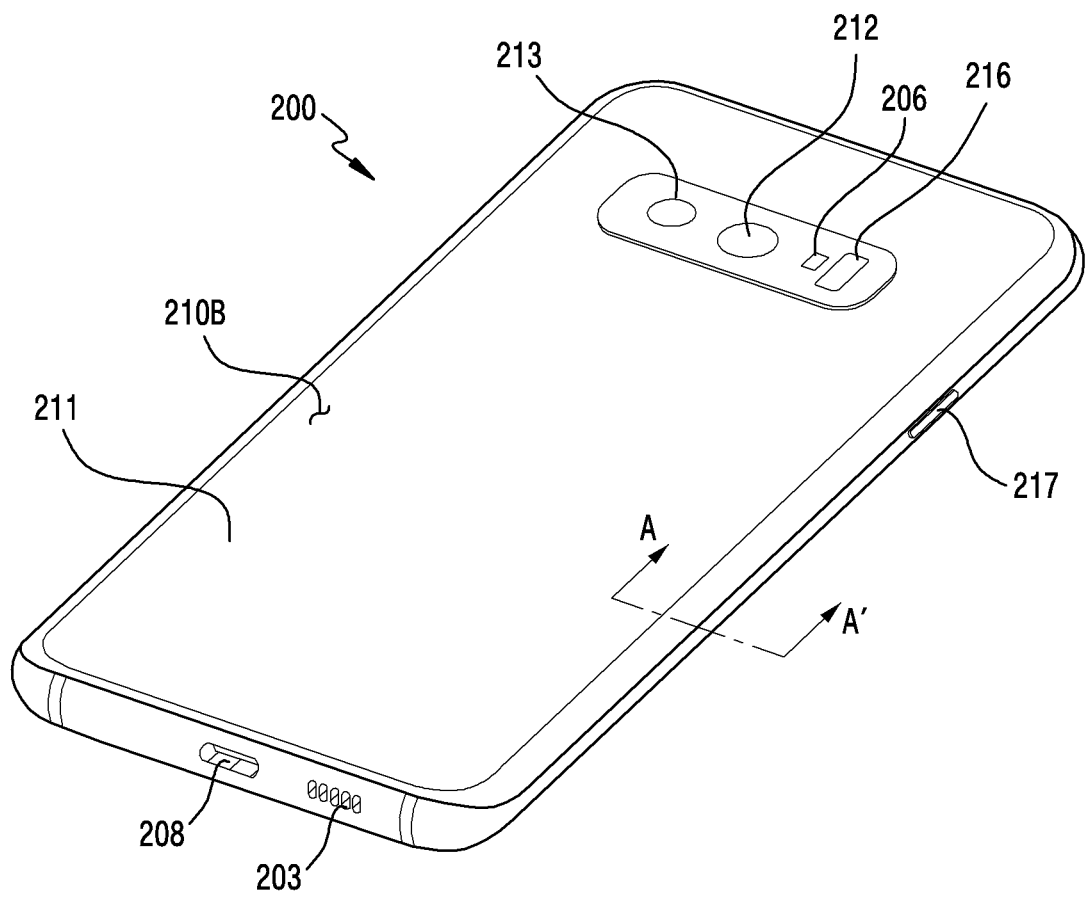
FIG. 3 is a perspective view of the electronic device of FIG. 2 when seen from the rear.

FIG. 2 is a perspective view showing an electronic device according one of various embodiments disclosed herein and FIG. 3 is a perspective view of the electronic device of FIG. 2 when seen from the rear.

Referring to FIGS. 2 and 3, an electronic device 200 according to an embodiment may include: a housing 210 including a first face (or a front face) 210A, a second face (or a rear face) 210B, and a side surface 210C surrounding the space between the first face 210A and the second face 210B. In another embodiment (not illustrated), the term "housing" may refer to a structure forming some of the first face 210A, the second face 210B, and the side surface 210C of FIG. 2. According to an embodiment, at least a portion of the first face 210A may be formed of a substantially transparent front plate 202 (e.g., a glass plate or a polymer plate including various coating layers). According to embodiments, the front plate 202 may have a curved portion bending and seamlessly extending from a first surface210A to a rear plate 211 at least at a side edge portion.

According to embodiments, the second face 210B may be formed of a substantially opaque rear plate 211. The rear plate 211 may be formed of, for example, and without limitation, coated or colored glass, ceramic, a polymer, a metal (e.g., aluminum, stainless steel "STS," or magnesium), or a combination of two or more of these materials. According to an embodiment, the rear plate 111 may have a curved portion bending and seamlessly extending from the second face 210B to the front plate 202 at least at a side edge portion.

According to various embodiments, the side surface 210C is combined with a front plate 202 and a rear plate 211 and may be formed by a lateral bezel structure 218 (or a "lateral member or a side wall") including metal and/or a polymer. In an embodiment, the rear plate 211 and the lateral bezel structure 218 may be integrated and may include the same material (e.g., a metallic material such as aluminum).

According to an embodiment, the electronic device 200 may include at least one of a display 201, audio modules 203 and 214, sensor modules, camera modules 205, key input devices 217, and connector holes 208. In some embodiments, in the electronic device 200, at least one of the components (e.g., the key input devices 217) may be omitted, or other components may be additionally included.

For example, an electronic device 200 may include a sensor module (not shown). For example, a sensor including a proximity sensor or an illumination sensor may be integrated with a display 201 and/or may be disposed adjacent to the display 201 in a region that is provided by the front plate 202. In an embodiment, the electronic device 200 may further include a light emitting element which may be disposed adjacent to the display 201 in the region that is provided by the front plate 202. The light emitting element, for example, may provide state information of the electronic device 200 by emitting different colors or patterns of light. In another embodiment, the light emitting element, for example, may provide a light source interoperating with a camera module 205. The light emitting element, for example, may include an LED, an IR LED, and a xenon lamp.

The display 201 may be exposed through, for example, a large portion of the front plate 202. In some embodiments, the edges of the display 201 may be formed to be substantially the same as the contour shape of the front plate 202 adjacent thereto. In another embodiment (not shown), the distance between the outer contour of the display 201 and the outer contour of the front plate 202 may be substantially constant in order to enlarge the exposed area of the display 201.

In another embodiment (not shown), a recess or an opening may be formed in a portion of a display region of the display 201, and other electronic devices aligned with the recess or the opening such as a camera module 205 and a proximity sensor or an illumination sensor (not shown) may be included.

In another embodiment (not shown), at least one of the camera module 212 and 213, the fingerprint sensor 216, and the light-emitting element 206 may be included in the rear face of the screen display area of the display 201. In another embodiment (not shown), the display 201 may be coupled to or disposed adjacent to a touch-sensing circuit, a pressure sensor that is capable of measuring the intensity of the touch (pressure), and/or a digitizer that detects a magnetic-field-type stylus pen.

The audio modules 203 and 214 may include a microphone hole and speaker holes. The microphone hole may be audially connected with a microphone disposed therein so as to acquire external sound, and in some embodiments, multiple microphones may be disposed therein so as to detect even a direction of the recorded sound. In some embodiments, the speaker holes and the microphone hole may be implemented as a single hole, and/or a speaker may be connected with the speaker holes (e.g., a piezo speaker). The speaker holes may include an external speaker hole and a phone call receiver hole.

The electronic device 200 may include a sensor modules (not shown) to generate electrical signals or data values corresponding to the internal operating state or the external environmental state of the electronic device 200. The sensor modules may include, for example, a proximity sensor disposed on the first face 210A of the housing, a fingerprint sensor integrated or adjacent to the display 201, and/or HRM sensor disposed on the second face 210B of the housing 210. The electronic device 100 may further include at least one of sensors (not shown) such as, for example, and without limitation, a gesture sensor, a gyro sensor, an atmospheric pressure sensor, a magnetic sensor, an acceleration sensor, a grip sensor, a color sensor, an infrared (IR) sensor, a biosensor, a temperature sensor, a humidity sensor, an illuminance sensor, or the like.

The camera modules 205, 212, 213, and 206 may include a first camera device 205 disposed on the first face 210A of the electronic device 200 and a second camera device 212 and 213 disposed on the second face 210B, and/or a flash 206. The camera devices 205, 212 and 213 may include one or more lenses, an image sensor, and/or an image signal processor. The flash 206 may include, for example, a light-emitting diode or a xenon lamp. In some embodiments, two or more lenses (e.g., an infrared camera lens, a wide-angle lens, and a telephoto lens) and image sensors may be disposed on one face of the electronic device 200.

The key input devices 217 may be disposed on the side surfaces 210C of the housing 210. In another embodiment, the electronic device 200 may not include some or all of the above-mentioned key input devices 217, and a key input device 217, which is not included therein, may be implemented in another form, such as that of a soft key or the like on the display 201. In some embodiments, the key input devices may include a sensor module 216 disposed on the second face 210B of the housing 210.

The connector holes 208 may be capable of accommodating a connector for transmitting and receiving power and/or data to and from an external electronic device, and/or a connector for transmitting and receiving an audio signal to and from an external electronic device. For example, the connector holes 208 may include USB connector or earphone jack.

Figure 4:
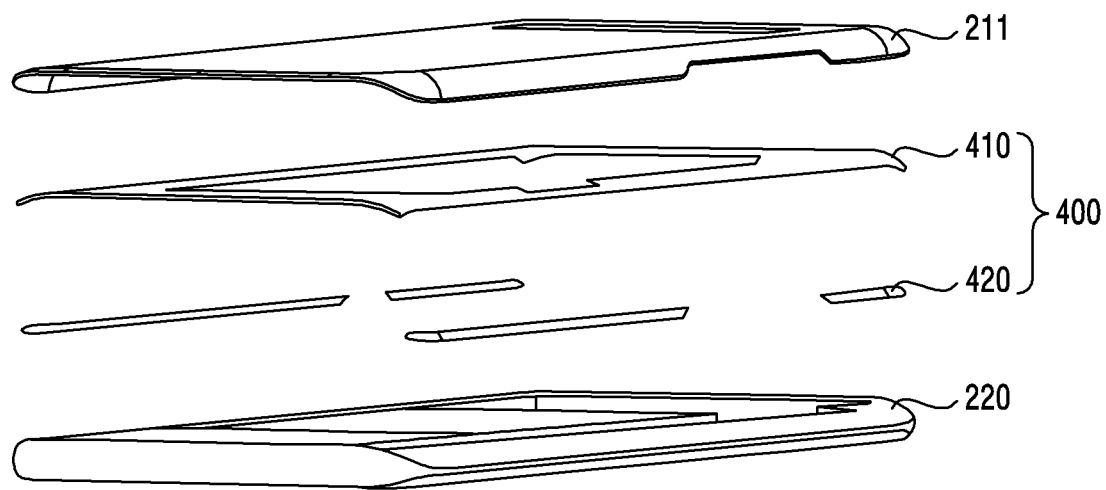
FIG. 4 is an exploded perspective view of the electronic device in FIG. 2.

FIG. 4 is an exploded perspective view of the electronic device shown in FIG. 2.

Referring to FIG. 4, the electronic device 200 may include a rear plate 211, a first adhesive member 420, a second adhesive member 410, and a support member 220 (e.g., the housing 210 in FIG. 2).

According to various embodiments, the support member 220 may be coupled to the rear plate 211 at the opposite surface (e.g., a rear surface) of the surface (e.g., a front surface) attached to a front plate (e.g., the front plate 202 in FIG. 2). For example, the support member 220 may be disposed between the front plate and the rear plate 211.

According to various embodiments, the first adhesive member 420 may be formed in a shape corresponding to the rear plate 211. For example, the first adhesive member 420 may be formed along the edge of the rear plate 211. The first adhesive member 420 may be formed in a closed curve. According to various embodiments, the first adhesive member 420 may be attached to one surface of the rear plate 211, and the rear plate 211 and the support member 220 may be coupled to each other by pressing the rear plate 211 and the support member 220.

According to various embodiments, the second adhesive member 410 may be disposed on the support member 220. The second adhesive member 410 may be located in the area of the support member 220 corresponding to a curved surface of the rear plate 211. The second adhesive member 410 may be attached to one surface of the rear plate 211, and the rear plate 211 and the support member 220 may be coupled to each other by pressing the rear plate 211 and the support member 220.

According to various embodiments, the first adhesive member 420 may be attached to a portion of a planar surface or a curved surface of the rear plate 211. The second adhesive member 410 may be attached to the curved surface of the support member 220. The curved area in which the second adhesive member 410 is located may have a greater slope than the curved area of the rear plate 211 in which the first adhesive member 420 is located. For example, the angle between the tangent of the surface of the rear plate 211 and the planar area of the rear plate 211 at the point in which the first adhesive member 420 is located may be smaller than the angle between the tangent of the surface of the rear plate 211 and the planar area of the rear plate 211 at the point in which the second adhesive member 410 is located.

Figure 5:
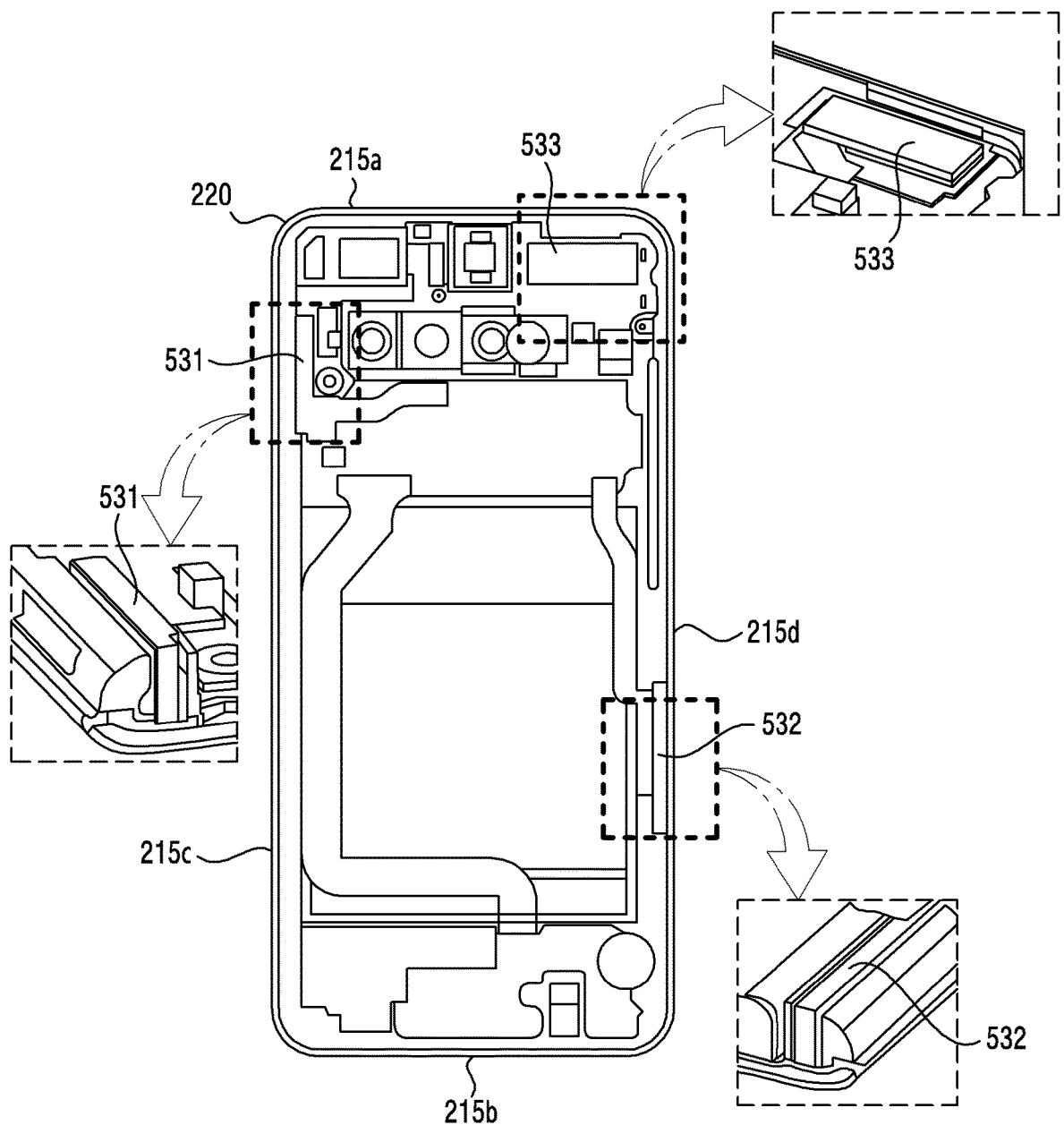
FIG. 5 is a diagram illustrating the arrangement of antennas in an electronic device according to various embodiments.

FIG. 5 is a diagram illustrating the arrangement of antennas in an electronic device according to various embodiments.

Referring to FIG. 5, the electronic device 200 may include a first antenna 531, a second antenna 532, and a third antenna 533. The first antenna 531, the second antenna 532, and the third antenna 533 may be included in the inner space of a housing (the side surface 210 in FIG. 2) or the support member 220.

According to various embodiments, the support member 220 may include a first edge 215a, a second edge 215b, a third edge 215c, and a fourth edge 215d. The first edge 215a of the support member 220 may form a portion of the side surface of the housing 210 (the side surface 210C in FIG. 2). For example, the first edge 215a may be an edge extending along the upper portion of the housing 210. The second edge 215b may face the first edge 215a, and may extend parallel with the first edge 215a to form a portion of the side surface of the housing 210 (e.g., the lower portion of the housing 210). The third edge 215c may extend from one end of the first edge 215a to one end of the second edge 215b so as to be substantially perpendicular to the first edge 215a and the second edge 215b. The fourth edge 215d may extend from the opposite end of the first edge 215a to the opposite end of the second edge 215b so as to be parallel with the third edge 215c. The first edge 215a and the second edge 215b may be shorter than the third edge 215c and the fourth edge 215d.

According to various embodiments, the first antenna 531 and the second antenna 532 may be mounted in the inner space formed by the support member 220 (e.g., the inner space of the housing 210) in the vertical direction relative to the rear plate 211 or the display 201. According to various embodiments, in order to secure a space for mounting electronic components (e.g., a battery) inside the housing 210 and ensure radiation performance of the first antenna 531 and the second antenna, the first antenna 531 and the second antenna 532 may be disposed such that the surfaces thereof having a greater width than other surfaces of the first and second antenna 531 and 532 face the side surface 210C. For example, the first antenna 531 and the second antenna 532 may be disposed such that the surfaces on which the patch array antennas thereof are provided face the side surface 210C.

According to various embodiments, the first antenna 531 and the second antenna 532 may be disposed along the long edges of the support member 220 (as opposed to the short edges, in a rectangular configuration). For example, the first antenna 531 may be disposed at the third edge 215c of the support member 220, and the second antenna 532 may be disposed at the fourth edge 215d of the support member 220. According to various embodiments, the first antenna 531 may be disposed to be intentionally misaligned with the second antenna 532. For example, the first antenna 531 may be disposed to be biased towards the first edge 215a at the third edge 215c, and the second antenna 532 may be disposed to be biased towards the second edge 215b at the fourth edge 215d.

Figure 6:
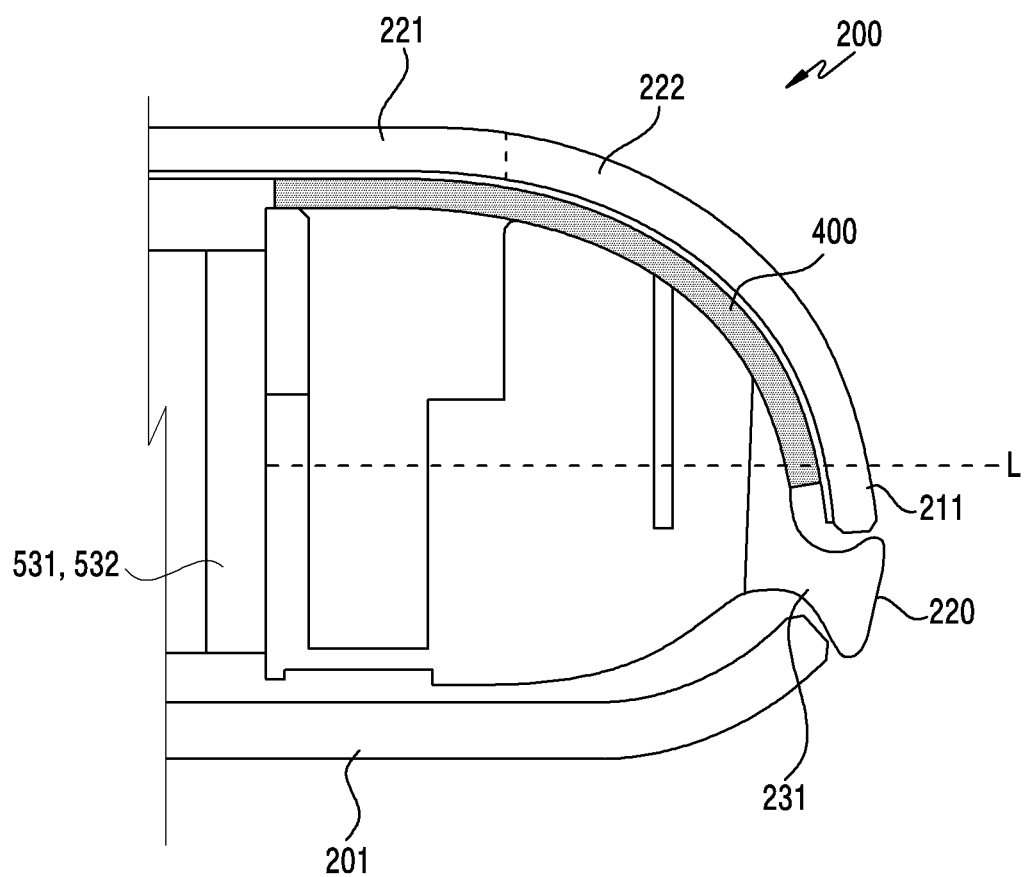
FIG. 6 is a cross-sectional view taken along the line A-A' in the electronic device shown in FIG. 3.
Figure 7:
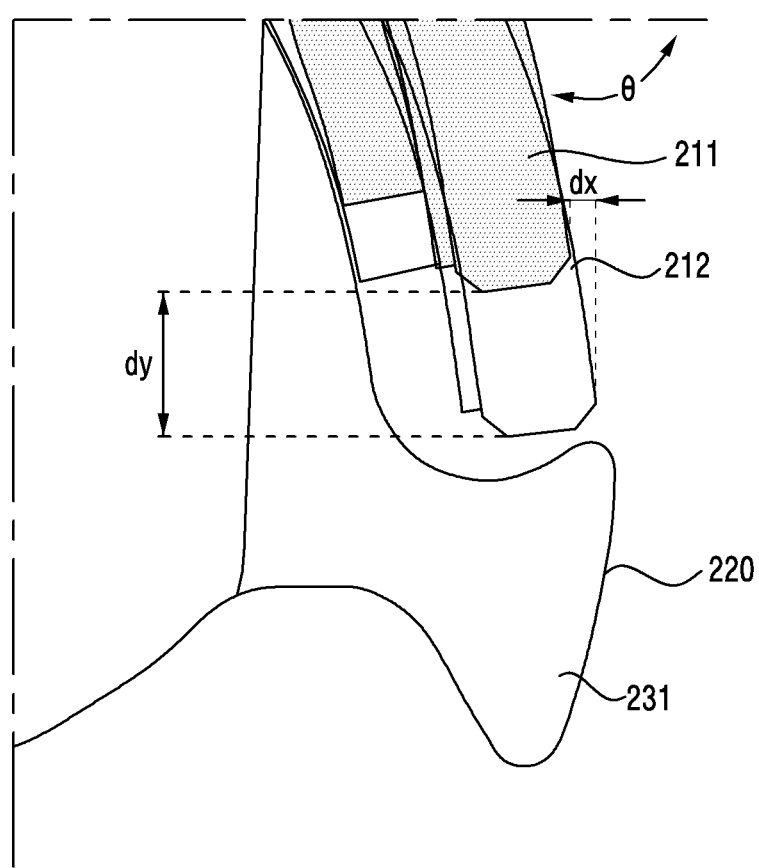
FIG. 7 is a cross-sectional view taken along the line A-A' in the electronic device shown in FIG. 3.
Figure 8:
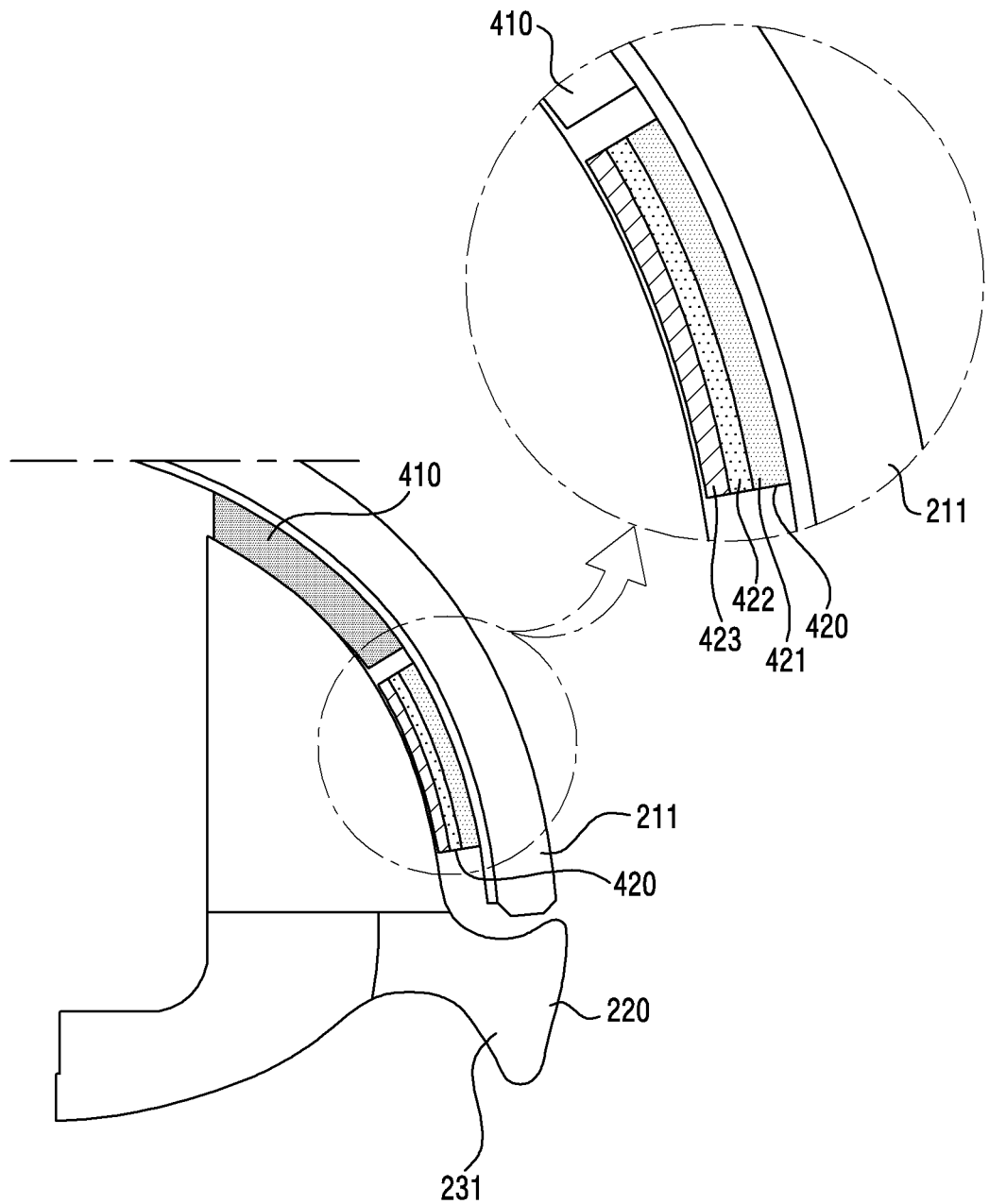
FIG. 8 is a cross-sectional view taken along the line A-A' in the electronic device shown in FIG. 3.

FIG. 6 is a cross-sectional view taken along the line A-A' in the electronic device shown in FIG. 3, FIG. 7 is a cross-sectional view taken along the line A-A' in the electronic device shown in FIG. 3, and FIG. 8 is a cross-sectional view taken along the line A-A' in the electronic device shown in FIG. 3.

Referring to FIG. 6, the electronic device 200 may include a rear plate 211, a support member 220, and an adhesive member 400. According to various embodiments, the rear plate 211 may include a planar area 221 and a curved area 222. The first antenna 531 and the second antenna 532 may radiate radio waves in the direction toward the rear plate 211. A number of metal electrodes and conductive members are located in the surface in which the display 201 is located, which may interfere with transmission of radio waves. The display 201 may in some cases be in constant contact with the user, such as when receiving a call or during manipulations of the electronic device 200. In order to prevent interference with radio waves caused by the display 201 and reduce the influence thereof on the user's body, the first antenna 531 and the second antenna 532 may include directivity oriented towards the rear plate 211. The rear plate 211 may include a glass material having a predetermined dielectric constant. In order to implement stable radiation of the first antenna 531 and the second antenna 532, the rear plate 211 may be formed as to cover over a wide area.

According to various embodiments, the support member 220 may include a protrusion 231 extending from the edge thereof. The protrusion 231 may be disposed to be close to the display 201, from the line (L) extending from the center of the surface where the patch array antenna of the first antenna 531 or the second antenna 532 is oriented toward the side surface (210C in FIG. 2). According to various embodiments, the protrusion 231 may be interposed between the end of the rear plate 211 and the end of the display 201. The protrusion 231 may be disposed to be close to the display 201 so that the rear plate 211 may form a large arrangement area. The protrusion 231 of the support member 220, which is made of a metal, is disposed to be biased towards the front of the electronic device 200, a non-conductive member may be provided in the space between the first antenna 531 and the second antenna 532 and the rear plate 211. The electronic device 200 may secure radiation coverage of the first antenna 531 or the second antenna 532 by employing the rear plate 211 according to the asymmetrical arrangement of the protrusion 231 and the arrangement space of the non-conductive member made by double injection According to various embodiments, the adhesive member 400 may be disposed between the rear plate 211 and the support member 220. The adhesive member 400 may be attached to the rear plate 211, and may be fixed to the support member 220.

Referring to FIG. 7, if the rear plate 211 is shifted by an assembly tolerance (dx) and attached to the support member 220, the rear plate 211 may slip by a distance (dy) towards the support member 220, and may then be attached thereto. The assembly tolerance of the rear plate 211 and the slip distance (dy) of the eventually attached rear plate 211 may have a relationship defined by the equation "$\tan \theta = dy/dx$". As the angle ($\theta$) between the planar area 221 of the rear plate 211 and the tangent of the point at which the support member 220 and the rear plate 211 contact with each other increases, the change in the slip distance (dy) due to the assembly tolerance (dx) may increase.

According to various embodiments, the protrusion 231 may be biased towards the display 201 in order to secure a large arrangement area in the rear plate 211. The angle ($\theta$) between the planar area 221 of the rear plate 211 and the tangent of the point at which the rear plate 211 is in contact with the support member 220 may be increased. According to various embodiments, the slip distance (dy) of the rear plate 211 may increase in the process of assembling a rear plate 211 that includes a large inclination.

According to various embodiments, if the slip distance (dy) of the rear plate 211 is increased, the rear plate 211 may be closer to the protrusion 231 of the support member 220. The rear plate 211 may be shifted towards the protrusion 231 of the support member 220 by external force. In this case, an impact due to contact between the moving rear plate 211 and the support member 220, or overlapping of the support member 220 and the protrusion 231 may cause damage to the electronic device 200.

According to various embodiments, if the rear plate 211 is moved by the slip distance (dy) during assembly, the adhesive member 400 may be moved to a certain position (or may be rolled) by the force applied thereto, which may cause lifting of an adhesive part of the adhesive member 400, non-adhesion of the adhesive member 400, reduction in the adhesive surface of the adhesive member 400, irregular deformation of the adhesion area, uneven thickness of the adhesive member 400 due to deformation thereof, or occurrence of stress inside the rear plate 211. In order to reduce deviance in the vertical direction due to the assembly tolerance of the rear plate 211 in the horizontal direction, or the amount of movement (or slippage) thereof along the surface of the support member 220 when assembling the rear plate 211, the adhesive member 400 may be attached specifically to the area in which the angle (θ) between the planar area 221 of the rear plate 211 and the tangent of the point at which the rear plate 211 is in contact with the support member 220 is small, and may not be attached to any remaining areas. In this case, the areas to which the tape is not attached may be damaged due to shaking of the rear plate 211 or impact by falling thereof.

Referring to FIG. 8, the electronic device 200 may include a first adhesive member 420 and a second adhesive member 410 in order to reduce deviance due to slippage of the rear plate 211 along the surface of the support member 220 according to the assembly of the rear plate 211 and prevent aggregation or curling of the adhesive member. The first adhesive member 420 and the second adhesive member 410 may be disposed between the rear plate 211 and the support member 220. The first adhesive member 420 may be attached to the support member 220, and the rear plate 211 may be attached or fixed to the support member 220 through the first adhesive member 420 by pressing the rear plate 211 to the support member 220. The second adhesive member 410 may be attached to the rear plate 211, and rear plate 211 may be attached to the support member 220 through the second adhesive member 410 by pressing the rear plate 211 to the support member 220.

According to various embodiments, the first adhesive member 420 may include a base film 422, a first adhesive layer 421 formed on one surface of the base film 422, and a second adhesive layer 423 formed on the opposite surface of the base film 422. The first adhesive layer 421 may be coated on the surface of the base film 422, which faces the rear plate 211. The first adhesive layer 421 may include a thermal activation material that is activated at a specified temperature or above (but not below the specified temperature). Once thermal activation material is activated by heat, even if the temperature of thermal activation material subsequently lower below a specified temperature, the thermal activation material may maintain the adhesion developed despite the loss of heat. The first adhesive layer 421 may be coated on the base film 422 at a temperature lower than a specified temperature so as to be in an inactive state at temperature 1 (e.g., room temperature or 0 degrees C. to 30 degrees C.) before heating the same. If the first adhesive layer 421 is heated to reach temperature 2 (e.g., 50 degrees C. to 300 degrees C.) higher than temperature 1, the first adhesive layer 421 may be activated to be attached to the rear plate 211. For example, if the first adhesive layer 421 is heated to a temperature higher than a specified temperature, the first adhesive layer 421 may undergo change in the phase or molecular structure thereof to become adhesive. Even if the temperature is lowered after the change in the phase or molecular structure, the first adhesive layer 421 may maintain adhesion. In the case where the rear plate 211 is placed on the first adhesive layer 421 at a temperature lower than a specified temperature (for example, at room temperature), even if slippage occurs, the rear plate 211 may easily move to a specified position (for example, a designed position). After adjusting the position of the rear plate 211, the first adhesive layer 421 may be heated to have adhesion by change in the phase or molecular structure, thereby fixing the rear plate 211. The fixed rear plate 211 may maintain the adhesion by the first adhesive layer 421 even after it is cooled. For example, the first adhesive layer 421 may remain in the active state of adhesion with a change in the temperature even after the adhesion is activated.

According to various embodiments, the thermal activation material included in the first adhesive member 420 may be a thermosetting material or a thermoplastic material. Thermoplastic material may rest in a solid state at a low temperature, and may lack adhesion. Thermoplastic material may switch, when heat is applied thereto, to an intermediate state that has viscosity between a solid state and a liquid state, and develop adhesion by wetting the surface of the rear plate 211. According to various embodiments, if the temperature of the first adhesive layer 421 (including a thermoplastic material) is lowered to room temperature while wetting the rear plate 211, the first adhesive layer 421 may maintain adhesion after transition to a solid state. The first adhesive layer 421 may include a thermoplastic material such as polyurethane, rubber, or olefin.

According to various embodiments, the temperature at which a solid phase thereof switches to a liquid phase (e.g., a second temperature) for the first adhesion layer 421 may be adjusted by configuring the ratio of compositions therein. The first adhesive layer 421 may be adapted to a temperature for phase change from the solid phase to the liquid phase to about 180 degrees C. In the assembling process, the rear plate 211 may be attached to the support member 220 through local heating in the area where the first adhesive layer 421 is present. Since there is no phase change of the first adhesive layer 421 at room temperature at which the electronic device is actually used, the rear plate 211 may be fixed to the support member 220.

According to various embodiments, the first adhesive layer 421 may include a thermosetting material. The thermosetting material has no adhesion property at room temperature, whereas the thermosetting material may have adhesion because the molecular structure thereof is cross-linked at a specified temperature or above. The first adhesive layer 421 having a thermosetting material may maintain bonding force with the support member 220 by activating the adhesion with the rear plate 211 at a high temperature. If the temperature is lowered to room temperature, the first adhesive layer 421 may maintain the adhesion with the rear plate 211.

According to various embodiments, the base film 422 may include a shock absorbing layer. For example, the base film 422 may be made of silicon, urethane, or rubber. The base film 422 may have elasticity, and may include pores, an embossing structure, or a mesh structure in order to maximize elasticity. When external force is applied to the rear plate due to an external impact on the electronic device 200, the base film 422 may absorb the impact between the rear plate and the support member 220, thereby preventing the separation of the rear plate 211 from the first adhesive member 420.

According to various embodiments, the second adhesive layer 423 may be provided on the surface facing the support member 220, and may include a thermo-reactive material. The thermo-reactive material may be a material of which the adhesion is lowered or inactivated while heat is applied thereto and is reactivated upon returning to room temperature. According to various embodiments, the second adhesive layer 423 may have adhesion at room temperature, and may be provided to be attached to the support member 220. The rear plate 211 may be disposed on the support member 220, and if the first adhesive member 420 is heated, the adhesion between the rear plate 211 and the first adhesive layer 421 is activated, so that the rear plate 211 may be coupled to the first adhesive layer 421. In addition, the adhesion between the second adhesive layer 423 and the support member 220 is lowered or deactivated, which enables the adjustment of the position of the rear plate 211 having a large inclination. According to various embodiments, the thermo-reactive material may be separated when heat is applied thereto again, thereby facilitating correction of the position in post-management or reassembly.

According to various embodiments, the first adhesive member 420 may have various kinds of materials forming the first adhesive layer 421, the second adhesive layer 423, and base film 422. For example, the thermal activation material of the first adhesive layer 421 may be a thermoplastic material, and the second adhesive layer 423 may include a thermo-reactive material. According to another embodiment, the thermal activation material of the first adhesive layer 421 may include the same thermoplastic material, and the second adhesive layer 423 may include a material having adhesion regardless of the temperature. According to another embodiment, the thermal activation material of the first adhesive layer 421 may be a thermosetting material, and the second adhesive layer 423 may include a thermo-reactive material. According to another embodiment, the thermal activation material of the first adhesive layer 421 may be a thermosetting material, and the second adhesive layer 423 may include a material having adhesion regardless of the temperature.

The second adhesive member 410 may have adhesion both on the surface facing the rear plate 211 and on the surface facing the support member 220. The first adhesive member 420 may have a base film therein, and an adhesive material may be coated on both sides of the base film. According to various embodiments, the second adhesive member may include an adhesive material including acrylic, urethane, silicone, or epoxy. The second adhesive member may be a pressure sensitive adhesive (PSA).

According to various embodiments, the second adhesive member 410 may be attached to the rear plate 211, and the first adhesive member 420 may be attached to the support member 220 in the manufacturing process. Since the first adhesive layer 421 of the first adhesive member 420 is inactivated at room temperature, it is possible to adjust the position of the rear plate even if slippage occurs. According to various embodiments, the rear plate 211 may be attached to the support member 220 at a specified position by heating the same after the rear plate 211 is adjusted to a designed position.

Figure 9:
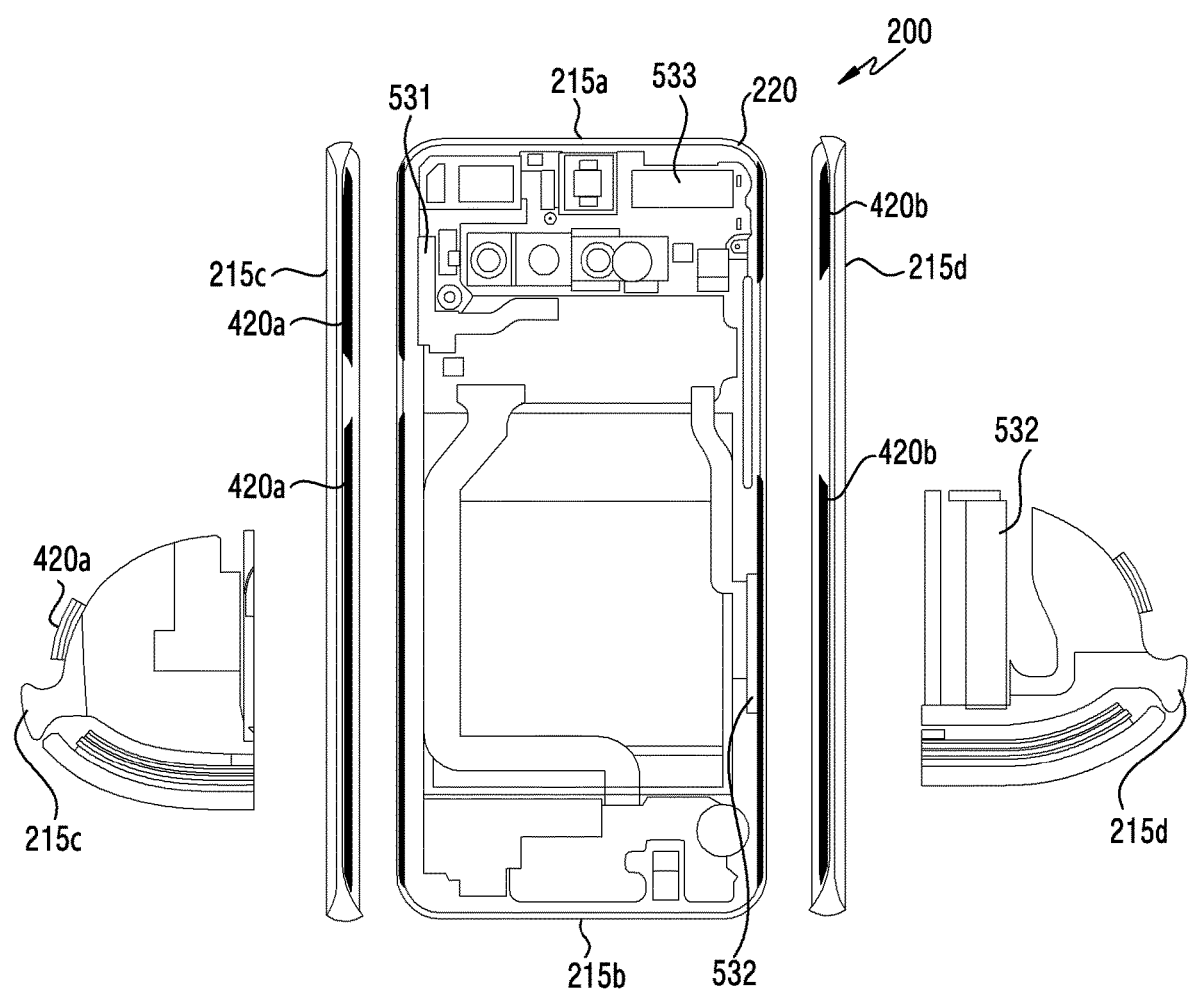
FIG. 9 illustrates an adhesive member attached to a support member of an electronic device according to various embodiments.
Figure 10:
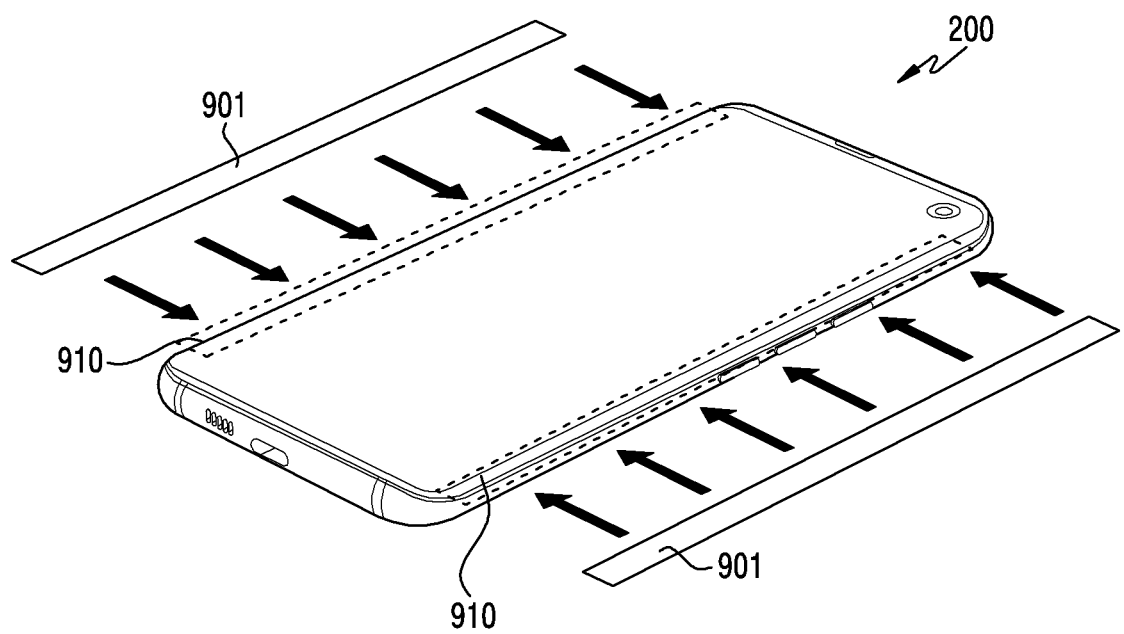
FIG. 10 illustrates a process of heating a rear plate coupled to the attached adhesive member in FIG. 9.

FIG. 9 illustrates an adhesive member attached to a support member of an electronic device according to various embodiments, and FIG. 10 illustrates a process of heating a rear plate coupled to the attached adhesive member in FIG. 9.

Referring to FIG. 9, first adhesive members 420A and 420B may be attached to a third edge 215c and a fourth edge 215d of a support member 220. The first adhesive members 420A and 420B may be formed on the side surfaces of the support member 220. The first adhesive member 420A and 420B may be activated when heat is applied thereto. In order to prevent the heat applied to the first adhesive members 420A and 420B from being transferred to the electronic components, a heat source for heating the first adhesive member 420A may be disposed at the side of the electronic device 200 during the heating process. It is possible to prevent the heat from being directly applied to the electronic components by providing the heat source at the side of the electronic device. According to various embodiments, the support member 220 may include a layer or a coating layer on the surface where the adhesive member is placed in order to prevent heat from being transferred to the inside of the electronic device 200. For example, the support member 220 may have a heat-resistant film stacked on the side surface thereof or a heat-resistant coating solution applied thereto. According to various embodiments, the first adhesive member 420A or 420B may not be provided in a portion of the side surface of the third edge 215c or the fourth edge 215d. The area in which the first adhesive member 420A or 420B is not provided may be an area in which a key button is disposed to be exposed to the side surface of the support member 220. As another example, the area in which the first adhesive member 420A or 420B is not provided may be an area in which the rear plate 211 is not positioned because a key button or another member is positioned therein.

Referring to FIG. 10, the electronic device 200 may be partially heated specifically at adhesion areas 910 in which the first adhesive member 420 is disposed. The first adhesive member 420 may be heated by a heat source 901 arranged at the side of the electronic device 200. The heat source 901 may transfer heat to the first adhesive member 420 by emitting laser or infrared light toward the adhesion area 910. As another example, the heat source 901 may apply heat to the rear plate 211 of the adhesion area 910 while being in contact therewith, thereby transferring heat to the first adhesive member 420. The laser emitted from the heat source, including a laser light source, may pass through the rear plate 211 to directly generate heat in the first adhesive member 420. The adhesion of the first adhesive layer 421 of the first adhesive member 420 may be activated. According to another embodiment, the infrared rays emitted from the heat source may pass through the rear plate 211 and vibrate the atoms of the first adhesive member 420 to generate heat. According to another embodiment, the heat source may directly generate heat while being in contact with the adhesion area 910 of the rear plate 211. The heat generated by the heat source may be transferred through the rear plate 211, thereby activating the adhesion of the first adhesive member 420.

According to various embodiments, the first adhesive member 420 may include an ultraviolet cure adhesive material. The rear plate or the adhesion area 910 may include a material having ultraviolet transmittance. If the ultraviolet light emitted from a light source is irradiated to the adhesion area 910, the first adhesive member 420 disposed in the adhesion area 910 may have a change in the molecular structure thereof, thereby fixing the rear plate 211 and the support member 220.

Figure 11:
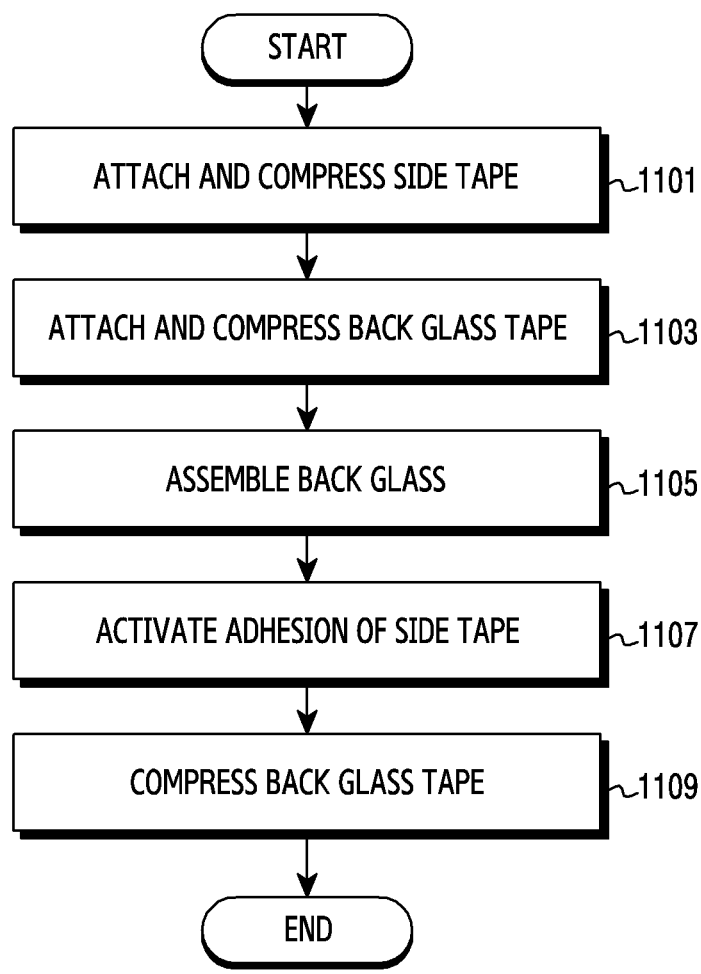
FIG. 11 is a flowchart illustrating a process of assembling an electronic device according to various embodiments.
Figure 12:
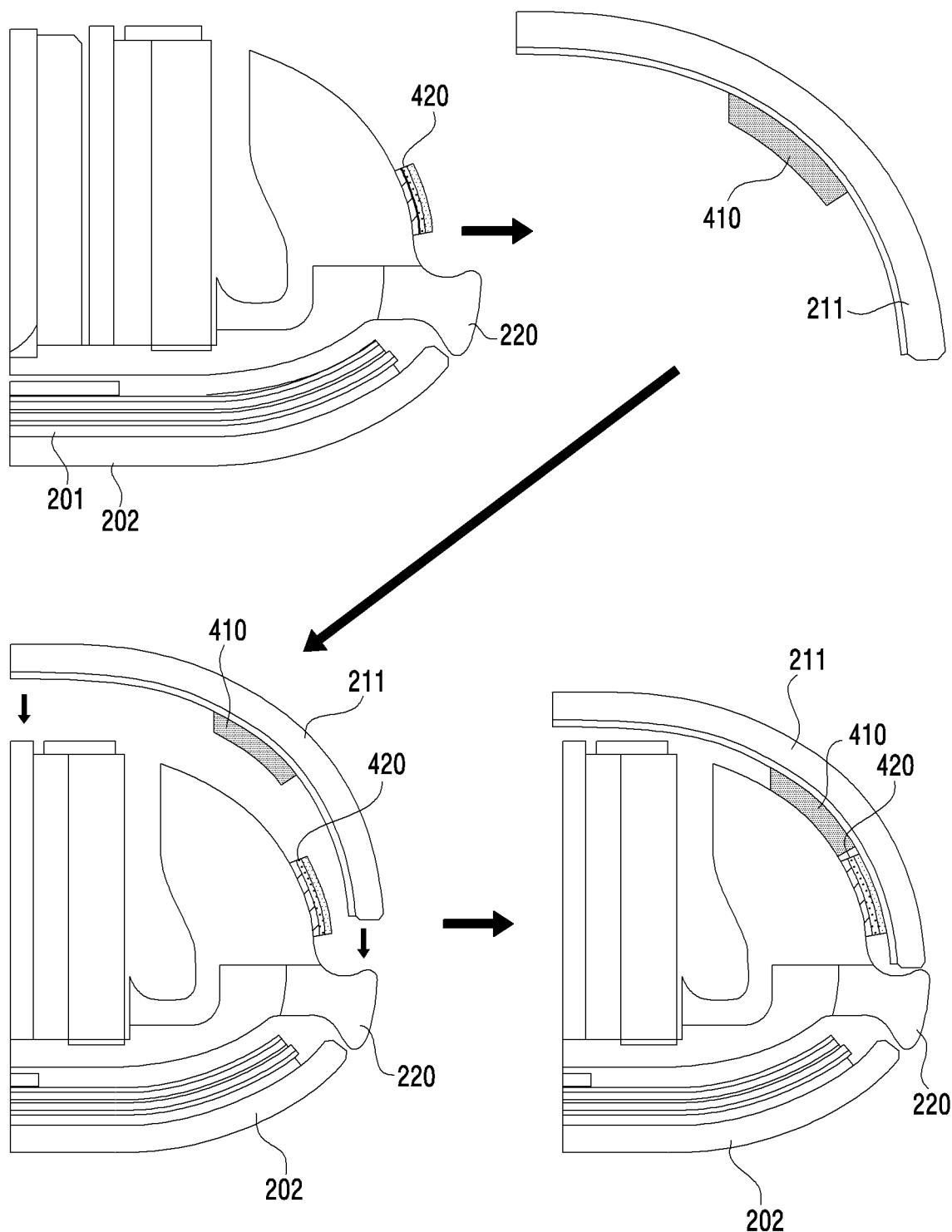
FIG. 12 illustrates a process of assembling an electronic device according to various embodiments.

FIG. 11 is a flowchart illustrating a process of assembling an electronic device according to various embodiments, and FIG. 12 illustrates a process of assembling an electronic device according to various embodiments.

Referring to FIGS. 11 and 12, a side tape may be attached and compressed to a support member (e.g., the support member 220 in FIG. 4) in operation 1101. The side tape may include the first adhesive member 420 in FIG. 4. A second adhesive layer (e.g., the second adhesive layer 423 in FIG. 8) of the first adhesive member may be attached to the support member 220, having adhesion properties at room temperature. A first adhesive layer (e.g., the first adhesive layer 421 in FIG. 8) may rest in an inactive state of adhesion at room temperature.

In operation 1103, a back glass tape (e.g., the second adhesive member 410 in FIG. 4) may be attached to and compressed onto the rear plate (e.g., the rear plate 211 in FIG. 4). The second adhesive member 410 may have activated adhesion regardless of the temperature. The second adhesive member may be attached to the area having a small inclination in the curved area 222 of the rear plate 211.

In operation 1105, the rear plate 211 may be attached to the support member 220. The second adhesive member 410 attached to the rear plate 211 and may have adhesion on both sides thereof. The first adhesive member 420 attached to the support member 220 may have weak adhesion, or may be in an inactive state of adhesion on the surface in contact with the rear plate. According to various embodiments, the rear plate 211 and the support member 220 may be attached by means of the second adhesive member 410 attached to the area having a small inclination, in which slippage seldom occurs. Even in the case of movement by the slip distance according to the assembly tolerance between the rear plate 211 and the support member 220, the deformation of the second adhesive member 410 may be lessened.

According to various embodiments, the first adhesive member 420 may be disposed in the area in which the support member 220 has a large inclination, and the first adhesive layer 421 in contact with the rear plate 211 may be resting in an inactive state. The rear plate 211 may be fixed by means of the second adhesive layer 423 after being moved to the position according to the assembly tolerance and aligned therein, and the first adhesive layer 421 may fix the rear plate 211 through operation 1107.

In operation 1107, the heat source may apply heat to the adhesion area (e.g., the adhesion area 910 in FIG. 9), and may activate the adhesion of the first adhesive member (or the side tape). The first adhesive layer 421 of the first adhesive member 420 may be heated by the heat transferred from the heat source. The first adhesive layer 421 may fix the rear plate 211 by activation of the adhesion at a specified temperature or above. Since the adhesion of the second adhesive layer 423 may be lowered due to the heat transferred from the heat source, the second adhesive layer 423 may not be lifted or deformed even if the rear plate 211 moves according to the slippage due to the assembly tolerance.

In operation 1109, the back glass tape (or the second adhesive member 410) may be compressed to fix the rear plate 211 and the support member 220. The operations described above make it possible to perform position alignment when some adhesive layers of the first adhesive member 420 are in an inactive state. If the heated first adhesive member 420 is cooled to room temperature, the second adhesive layer 423 may also have adhesion so as to be fixed. The rear plate 211 may be eventually fixed to the support member 220 by compressing the area to which the second adhesive member 410 is attached.

Figure 13:
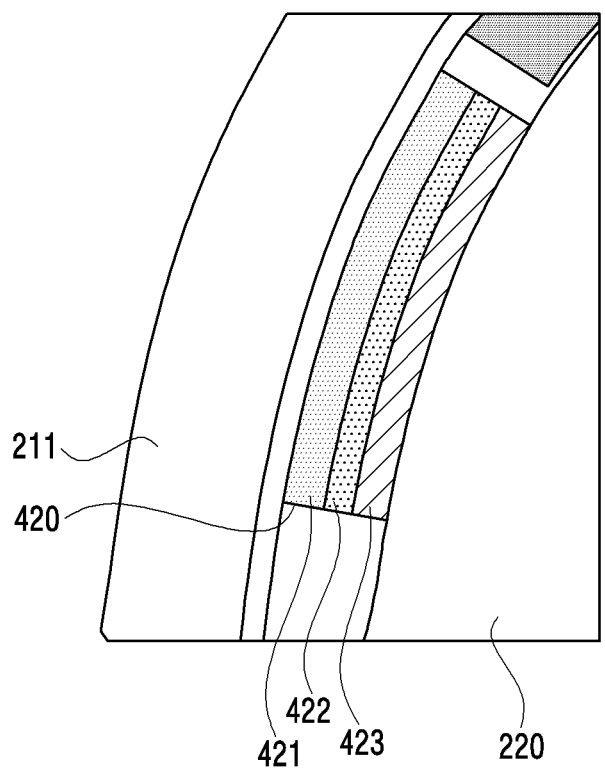
FIG. 13 illustrates a process of assembling an electronic device and an attached adhesive tape according to various embodiments.
Figure 13:
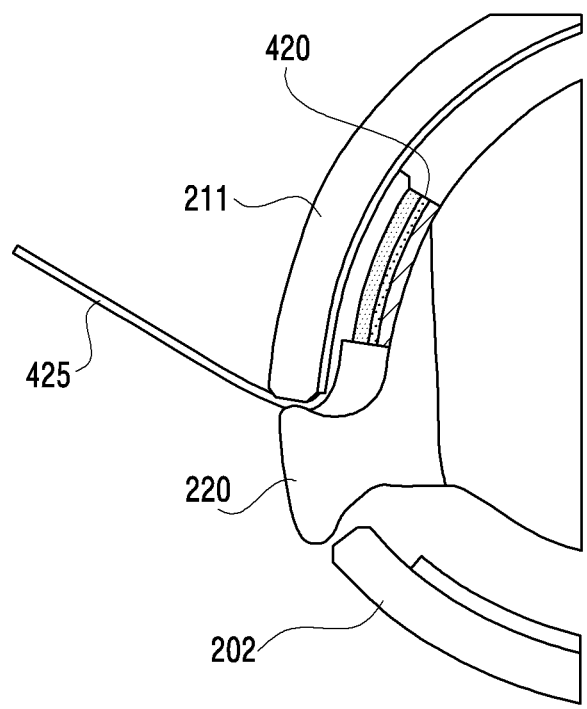

FIG. 13 illustrates a process of assembling an electronic device and an attached adhesive member according to various embodiments.

Referring to FIG. 13, the rear plate 211 may be attached or fixed to the support member 220 by means of the first adhesive member 420. According to various embodiments, the first adhesive member 420 may be configured as a double-sided tape. For example, the first adhesive layer 421 and the second adhesive layer 423 may be adhesive layers having adhesion regardless of the temperature. According to various embodiments, the first adhesive layer 421 and the second adhesive layer 423 may include an adhesive material made of, for example, acrylic, urethane, silicone, or epoxy. According to various embodiments, the first adhesive layer 421 and the second adhesive layer 423 may be pressure sensitive adhesives (PSAs).

According to various embodiments, a release paper (e.g., a liner) 425 may be interposed between the first adhesive layer 421 and the rear plate 211. The adhesion of the rear plate 211 and the first adhesive layer 421 with respect to the support member 220 may be reduced by means of the release paper 425 in the assembly process. The release paper 425 may be removed after adjusting the rear plate 211 by slipping the same. The rear plate 211 may come into contact with the first adhesive layer 421 by removing the release paper 425, and may be coupled to the support member 220 through compression.

According to various embodiments, the release paper 425 may include a material having tensile force and ductility. For example, the release paper 425 may include a polyethylene terephthalate (PET) or polyethylene (PE) material.

Figure 14:
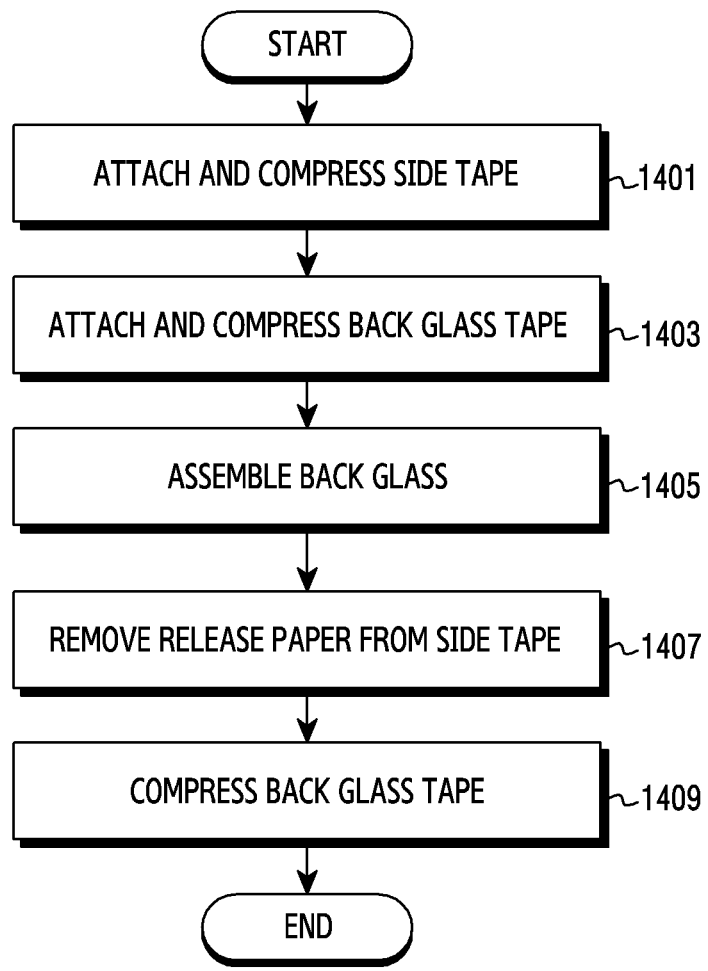
FIG. 14 is a flowchart illustrating a process of assembling the electronic device shown in FIG. 13.
Figure 15:
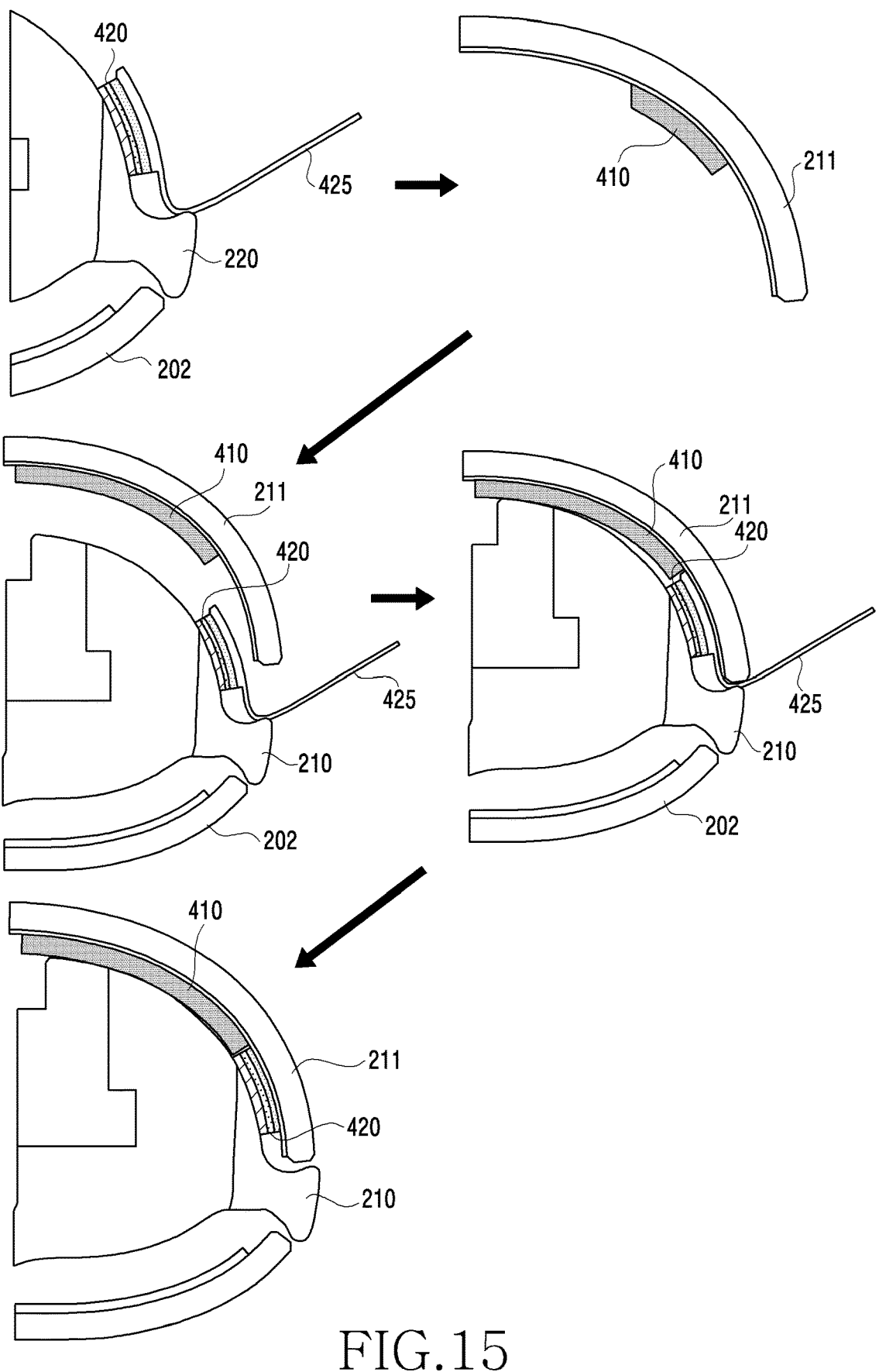
FIG. 15 illustrates a process of assembling the electronic device shown in FIG. 13.

FIG. 14 is a flowchart illustrating a process of assembling the electronic device shown in FIG. 13, and FIG. 15 illustrates a process of assembling the electronic device shown in FIG. 13.

Referring to FIGS. 14 and 15, in operation 1401, a side tape may be attached and compressed to a support member (e.g., the support member 220 in FIG. 13). The side tape may be the first adhesive member 420 in FIG. 13. A second adhesive layer (e.g., the second adhesive layer 423 in FIG. 13) of the first adhesive member 420 may be attached to the support member 220. A first adhesive layer (e.g., the first adhesive layer 421 in FIG. 13) may be in contact with the release paper 425. The first adhesive layer 421 may have an effect of deactivating the adhesion.

In operation 1403, a back glass tape (or the second adhesive member 410 in FIG. 13) may be attached and compressed to the rear plate (e.g., the rear plate 211 in FIG. 4). The second adhesive member 410 may have an adhesion property. The second adhesive member 410 may be attached to the area having a small inclination in the curved area 222 of the rear plate 211.

In operation 1405, the rear plate 211 may be attached to the support member 220 to then be assembled thereto. The second adhesive member 410 attached to the rear plate 211 may have adhesion on both sides. The first adhesive member 420 attached to the support member 220 may be in an inactive state of adhesion due to a release paper on the surface in contact with the rear plate. According to various embodiments, the rear plate 211 and the support member 220 may be attached by means of the second adhesive member 410 attached to the area having a small inclination, in which slippage rarely occurs. Even in the case of movement by the slip distance according to the assembly tolerance between the rear plate 211 and the support member 220, the deformation of the second adhesive member 410 may be less.

According to various embodiments, the first adhesive member 420 may be disposed in the area in which the support member 220 has a large inclination, and the first adhesive layer 421 in contact with the rear plate 211 may be in an inactive state. The rear plate 211 may be fixed by means of the second adhesive layer 423 after being moved to the position according to the assembly tolerance and aligned therein, and the first adhesive layer 421 may fix the rear plate 211 through operation 1107.

In operation 1407, the release paper 425 interposed between the first adhesive layer 421 and the rear plate 211 may be removed. The first adhesive layer 421 may be attached to the rear plate 211 by removing the release paper 425. The rear plate 211 may be coupled to the support member 220 by means of the first adhesive layer 421.

In operation 1409, the back glass tape (or the second adhesive member 410) may be compressed to fix the rear plate 211 and the support member 220.

Figure 16:
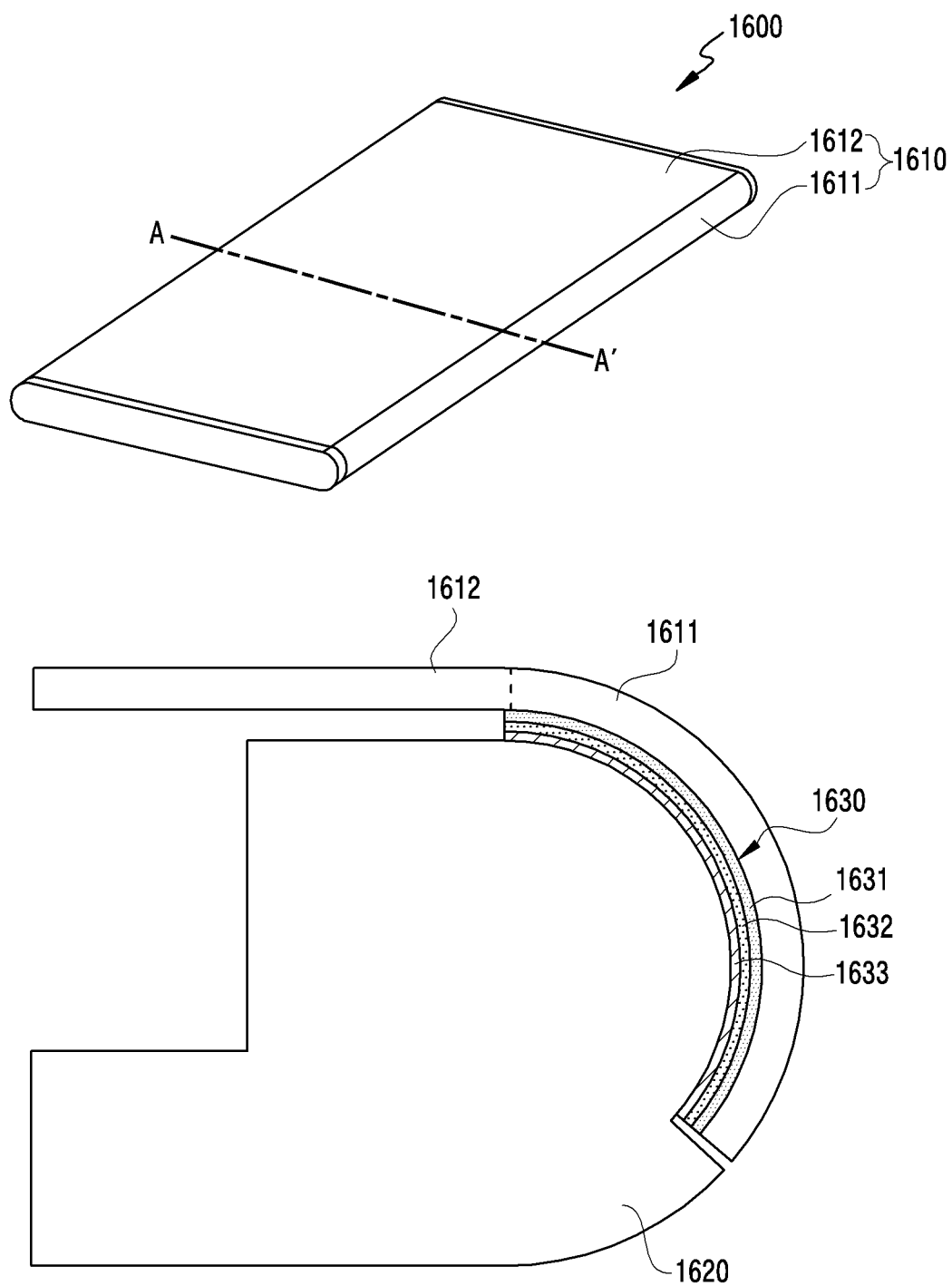
FIG. 16 illustrates a perspective view and a cross-sectional view of an electronic device according to another embodiment.

FIG. 16 illustrates a perspective view and a cross-sectional view of an electronic device according to another embodiment.

Referring to FIG. 16, an electronic device 1600 may include a support member 1620 forming a housing and a plate 1610 coupled to the support member 1620. The plate 1610 may be formed of a glass material or a polymer material. The plate 1610 may be disposed on the surface on which the display of the electronic device is disposed or on the surface facing the surface on which the display of the electronic device is disposed.

According to various embodiments, the plate 1610 may include a planar area 1612 and curved area of the plate 1611 extending from at least one edge of the planar area 1612. The planar area 1612 of the plate 1610 may form one surface of the electronic device 1600, and the curved area of the plate 1611 may form a portion of the side surface of the electronic device 1600. The curved area of the plate 1611 of the plate 1610 may be coupled to the support member 1620 by means of an adhesive member 1630 including a plurality of layers. The adhesive member 1630 may include a base film 1632, a the first adhesive layer 1631 formed on one surface of the base film 1632, and a second adhesive layer 1633 formed on the opposite surface of the base film 1632. The first adhesive layer 1631 may be coated on the surface facing the plate 1610, based on the base film 1632. The first adhesive layer 1631 may include a thermal activation material that is activated at a specified temperature or above. If the temperature is lower than a specified temperature, the first adhesive layer 1631 may be in an inactive state of adhesion, and if the temperature is higher than a specified temperature, the first adhesive layer 1631 may be activated so as to be attached to the plate 1610. Thermal activation material included in the first adhesive layer 1631 may be a thermosetting material or a thermoplastic material.

According to various embodiments, the second adhesive layer 1633 may include a thermo-reactive tape. The second adhesive layer 1633 may be made of a material of which the adhesion is inactivated at a predetermined temperature or above and is activated at a temperature below a predetermined temperature. According to various embodiments, the second adhesive layer 1633 may be a normal adhesive tape.

According to various embodiments, the first adhesive layer 1631 may be formed on the surface facing the plate 1610, and the second adhesive layer 1632 may be formed on the surface facing the support member 1620. The adhesive member 1630 may be coupled to the support member 1620 by means of the second adhesive layer 1632 before it is assembled with the plate 1610. Thereafter, the plate 1611 may be coupled to the support member 1620 through activation of the first adhesive layer 1631.

Figure 17:
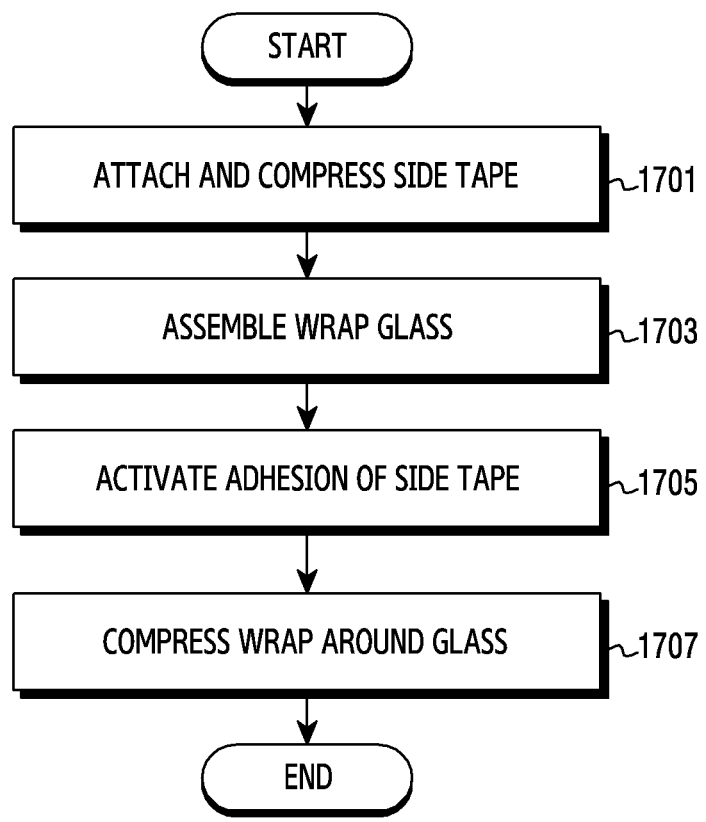
FIG. 17 is a flowchart illustrating a process of assembling the electronic device shown in FIG. 16.
Figure 18:
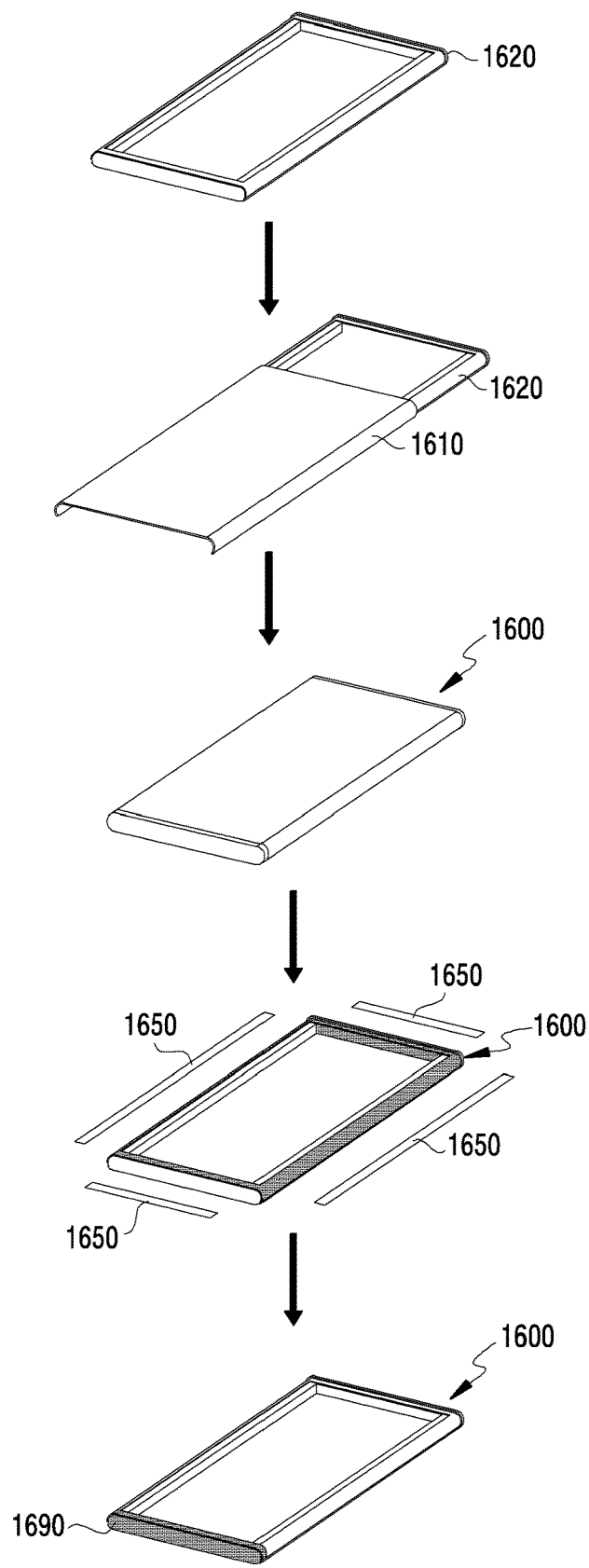
FIG. 18 illustrates a process of assembling the electronic device shown in FIG. 16.

FIG. 17 is a flowchart illustrating a process of assembling the electronic device shown in FIG. 16, and FIG. 18 illustrates a process of assembling the electronic device shown in FIG. 16.

Referring to FIG. 17, in operation 1701, a side tape may be attached and compressed to a support member (e.g., the support member 1620 in FIG. 16). The side tape may be the adhesive member 1630 in FIG. 16. A second adhesive layer (e.g., the second adhesive layer 1633 in FIG. 16) of the first adhesive member may be attached to the support member 1620 because it has adhesion at room temperature. The first adhesive layer (e.g., the first adhesive layer 1631 in FIG. 16) may be in an inactive state of adhesion at room temperature.

In operation 1703, the plate 1611 may be attached to the support member 1620 to then be assembled therewith. The plate 1611 may be assembled with the support member by means of the adhesive member 1630 attached to the support member 1620. The adhesive member 1630 may have weak adhesion, or may be in an inactive state of adhesion on the surface in contact surface with the plate 1611. According to various embodiments, the plate 1610 and the support member 1620 may need to be moved in the assembly process. Referring to FIG. 18, the plate 1610 may be assembled with the support member 1620 by sliding thereon while surrounding both edges of the support member 1620. Since the first adhesive layer 1621 of the adhesive member 1630 attached to the support member 1620 is in an inactive state, the plate 1610 may slide on the support member 1620.

According to various embodiments, the adhesive member 1630 may be disposed in the area in which the support member 1620 has a large inclination or the area in which movement occurs during the assembly. The first adhesive layer 1631 in contact with the plate 1610 may be in an inactive state of adhesion. The plate 1610 may slide or move along the support member 1620 to then be completely attached. According to various embodiments, after completion of assembly, the first adhesive layer 1631 may fix the plate 1610 through operation 1705.

In operation 1705, a heat source 1650 may apply heat the adhesion area to activate the adhesion of the first adhesive member 1630 (or the side tape). The first adhesive layer 1631 of the first adhesive member 1630 may be heated by heat transferred from the heat source. The first adhesive layer 1631 may fix the plate 1610 by activating adhesion thereof at a specified temperature or above. According to various embodiments, the first adhesive layer 1631 of the first adhesive member 1630 may increase in volume by heating the same, so that the adhesion area between the first adhesive member 1630 and the rear plate may be increased, thereby activating adhesion. Since the adhesion of the second adhesive layer 1632 may be lowered by the heat transferred from the heat source, the second adhesive layer 1632 may not be lifted or deformed even if the plate 1610 is moved in operation 1703.

In operation 1707, the plate 1610 may be coupled to the support member 1620 through the heated the first adhesive member 1630 by pressing a wraparound glass (or the plate 1610). After coupling the plate 1610 to the support member 1620, the electronic device 1600 may have decoration 1690 added to the side surface thereof. The decoration 1690 may be provided to various positions, as well as the side surface, of the electronic device.

An electronic device (e.g., the electronic device 200 in FIG. 6) according to various embodiments described above may include: a first plate (e.g., the rear plate 211 in FIG. 6) including a planar area (e.g., the planar area 221 in FIG. 6) directed in a first direction and a curved area (e.g., the curved area 222 in FIG. 6) extending from at least a portion of an edge of the planar area; a second plate (e.g., the display 201 in FIG. 6 or the front plate 202 in FIG. 2) directed in a second direction opposite the first direction and configured to form an inner space with the first plate; a support member (e.g., the support member 220 in FIG. 6) disposed between the first plate and the second plate so as to surround the inner space; and a first adhesive member (e.g., the first adhesive member 420 in FIG. 4) disposed between the curved area of the first plate and the support member, such that the first adhesive member may include a first adhesive layer (e.g., the first adhesive layer 421 in FIG. 8) attached to at least a portion of the curved area of the first plate and activated by heat and a second adhesive layer (e.g., the second adhesive layer 423 in FIG. 8) attached to at least a portion of the support member.

According to various embodiments, the first adhesive layer may be in an inactive state at a first temperature, and may switch to an active state if the first temperature is changed to a second temperature higher than the first temperature.

According to various embodiments, the first adhesive layer may maintain adhesion if the second temperature is changed to the first temperature after being activated at the second temperature.

According to various embodiments, the first temperature may be 0 degrees C. to 30 degrees C., and the second temperature may be 50 degrees C. to 300 degrees C.

According to various embodiments, the first adhesive layer may include at least one of a thermoplastic material or a thermosetting material.

According to various embodiments, the second adhesive layer may include an adhesive material that is activated at the first temperature and is deactivated at the second temperature.

According to various embodiments, the planar area may have a rectangular shape, and the electronic device may further include a second adhesive member (e.g., the second adhesive member 410 in FIG. 8) disposed along the edge of the planar area.

According to various embodiments, the second adhesive member may be formed in a closed curve corresponding to the shape of the planar area.

According to various embodiments, the first plate may have a substantially rectangular shape, and may have a first edge (e.g., the first edge 215a in FIG. 5), a second edge (e.g., the second edge 215b in FIG. 5) parallel with the first edge, a third edge (e.g., the third edge 215c in FIG. 5) extending from one end of the first edge to one end of the second edge, and a fourth edge (e.g., the fourth edge 215d in FIG. 5) extending from the opposite end of the first edge to the opposite end of the second edge, such that the first edge and the second edge may be shorter than the third edge and the fourth edge, and the first adhesive member may be attached to the third edge or the fourth edge.

According to various embodiments, the curved area of the first plate may extend along the side surface of the support member so as to form a side surface of the electronic device.

According to various embodiments, the electronic device may further include a plurality of antennas (e.g., the first antenna 531, the second antenna 532, and the third antenna 533 in FIG. 5) disposed along at least a portion of the edges of the electronic device, and at least one of the plurality of antennas may have a surface that has a greater width than other surfaces thereof and faces the side surface of the electronic device, and may be disposed adjacent to the support member.

According to various embodiments, the first adhesive member may be disposed at an edge of the support member, to which the at least one antenna is positioned adjacent.

According to various embodiments, the first adhesive member may be disposed in an area in which an angle between the planar area and the curved area is greater than a prespecified angle.

According to various embodiments, the second plate may be transparent so as to allow the light emitted from the display disposed in the space to pass therethrough.

An electronic device (e.g., the electronic device 200 in FIG. 6) according to various embodiments may include: a first plate (e.g., the rear plate 211 in FIG. 6) including a planar area (e.g., the planar area 221 in FIG. 6) and two curved areas (e.g., the curved area 222 in FIG. 6) extending from at least portions of long edges of the planar area; a second plate (e.g., the display 201 in FIG. 6 or the front plate 202 in FIG. 2) facing the first plate so as to form an inner space with the first plate; a support member (e.g., the support member 220 in FIG. 6) disposed between the first plate and the second plate so as to surround the inner space; a first antenna member (e.g., the first antenna member 531 in FIG. 5) and a second antenna member (e.g., the second antenna member 532 in FIG. 5) disposed adjacent to edges of the support member corresponding to the long edges on which the curved areas are formed; a first adhesive member (e.g., the first adhesive member 420 in FIG. 4) disposed between the curved area of the first plate corresponding to the long edge (e.g., the third edge 215c or the fourth edge 215d in FIG. 5) on which the first and second antenna members are positioned and the support member; and a second adhesive member (e.g., the second adhesive member 410 in FIG. 4) formed along the edges of the first plate, such that the first adhesive member may include a first adhesive layer (e.g., the first adhesive layer 421 in FIG. 8) forming a surface facing the curved area of the first plate and activated by heat and a second adhesive layer (e.g., the second adhesive layer 423 in FIG. 8) forming a surface facing the support member.

According to various embodiments, the first and second antennas may have surfaces, which have a greater width than other surfaces thereof and face the side surface of the electronic device, and may be disposed adjacent to the support member.

According to various embodiments, the electronic device may further include a third antenna including a surface having a greater width than other surfaces thereof and facing the first plate, and disposed adjacent to the edge of the support member corresponding to a short edge of the planar area.

According to various embodiments, the first adhesive layer may be in an inactive state at a first temperature, and may switch to an active state if the first temperature is changed to a second temperature higher than the first temperature.

According to various embodiments, the first adhesive layer may maintain adhesion if the second temperature is changed to the first temperature after being activated at the second temperature.

According to various embodiments, the second adhesive layer may include an adhesive material that is activated at the first temperature and is deactivated at the second temperature.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, modifications and changes may be made thereto without departing from disclosure. Therefore, the disclosure should not be defined as being limited to the embodiments, but should be defined by the appended claims and equivalents thereof. While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. An electronic device, comprising:
   a first plate including a planar area oriented in a first direction, and a curved area extending from at least a portion of an edge of the planar area;
   a second plate oriented in a second direction opposite the first direction, the first plate and second plate defining an inner space;
   a support member disposed between the first plate and the second plate configured to surround the inner space; and
   a first adhesive member disposed between the curved area of the first plate and the support member,
   wherein the first adhesive member includes:
      a first adhesive layer attached to at least a portion of the curved area of the first plate, and is activated by heat, and
      a second adhesive layer attached to at least a portion of the support member.

2. The electronic device of claim 1, wherein the first adhesive layer rests in an inactive state at a first temperature and
   wherein the first adhesive layer changes from the inactive state to an active state based on a change from the first temperature to a second temperature higher than the first temperature.

3. The electronic device of claim 2, wherein the first adhesive layer maintains adhesion when the second temperature reverts to the first temperature, after the change from the inactive state to the active state.

4. The electronic device of claim 3, wherein the first temperature is included in a first temperature range of substantially 0 degrees C. to 30 degrees C., and
   wherein the second temperature is included in a second temperature range of substantially 50 degrees C. to 300 degrees C.

5. The electronic device of claim 1, wherein the first adhesive layer is formed using at least one of a thermoplastic material and a thermosetting material.

6. The electronic device of claim 2, wherein the second adhesive layer is formed of an adhesive material that is activated at the first temperature and deactivated at the second temperature.

7. The electronic device of claim 1, wherein the planar area defines a rectangular shape, and
   wherein the first plate further includes a second adhesive member disposed along the edge of the planar area.

8. The electronic device of claim 7, wherein the second adhesive member is formed as a closed curve shape, corresponding to a shape of the planar area.

9. The electronic device of claim 1, wherein the first plate forms a substantially rectangular shape and includes a first edge, a second edge parallel with the first edge, a third edge extending from one end of the first edge to one end of the second edge, and a fourth edge extending from the opposite end of the first edge to the opposite end of the second edge,
   wherein the first edge and the second edge are shorter than the third edge and the fourth edge, and
   wherein the first adhesive member is attached to at least one of the third edge or the fourth edge.

10. The electronic device of claim 1, wherein the curved area of the first plate extends along a side surface of the support member, forming an outer side surface of the electronic device.

11. The electronic device of claim 1, further comprising a plurality of antennas disposed adjacent to the support member in the inner space, and
    wherein at least one of the plurality of antennas includes a surface that has a width greater than widths of other surfaces of the antenna, and is oriented in a third direction perpendicular to the first direction and the second direction.

12. The electronic device of claim 11, wherein the first adhesive member is disposed at an edge of the support member.

13. The electronic device of claim 12, wherein the first adhesive member is disposed in an area in which an angle defined between the planar area and the curved area is greater than a prespecified angle.

14. The electronic device of claim 1, wherein the second plate is transparent, allowing light emitted from a display disposed in the inner space to pass through the second plate.

15. An electronic device, comprising:
a first plate including a planar area, and two curved areas extending from at least some edges of the planar area;
a second plate facing the first plate, the first and second plates defining an inner space between them;
a support member disposed between the first plate and the second plate and surrounding the inner space;
first and second antennas disposed adjacent to edges of the support member corresponding to the at least some edges on which the curved areas are formed;
a first adhesive member disposed between the two curved areas of the first plate and the support member; and
a second adhesive member formed along the edges of the first plate,
wherein the first adhesive member comprises:
a first adhesive layer including a first surface facing the curved area of the first plate, the first adhesive layer activated by heat; and
a second adhesive layer including a second surface facing the support member.

16. The electronic device of claim 15, wherein the first and second antennas include surfaces having greater widths than other surfaces of the first and second antennas, the first and second antennas facing the side surface of the electronic device, and disposed adjacent to the support member.

17. The electronic device of claim 16, further comprising a third antenna including a surface having a greater width than other surfaces of the third antenna, the third antenna facing the first plate, and disposed adjacent to the edge of the support member corresponding to a short edge of the planar area.

18. The electronic device of claim 15, wherein the first adhesive layer rests in an inactive state at a first temperature, and changes from the inactive state to an active state based on the first temperature changing to a second temperature higher than the first temperature.

19. The electronic device of claim 18, wherein the first adhesive layer maintains adhesion when the second temperature reverts to the first temperature, after changing from the inactive state to the active state at the second temperature.

20. The electronic device of claim 18, wherein the second adhesive layer is formed by an adhesive material that is activated at the first temperature and is deactivated at the second temperature.

* * * * *